United States Patent
Sloan

[15] 3,656,893
[45] Apr. 18, 1972

[54] ION EXCHANGE REMOVAL OF CYANIDE VALUES

[72] Inventor: Walter John Sloan, Newark, Del.
[73] Assignee: E. I. du Pont de Nemours and Company, Wilmington, Del.
[22] Filed: July 2, 1970
[21] Appl. No.: 52,141

[52] U.S. Cl...................................23/77, 23/79, 260/2.1 M
[51] Int. Cl.............................................C01c 3/08, C01c 3/00
[58] Field of Search...................23/77, 79; 260/2.1 R, 2.1 M

[56] References Cited

UNITED STATES PATENTS

| | | | |
|---|---|---|---|
| 2,965,441 | 12/1960 | Welton | 23/79 |
| 1,962,559 | 6/1934 | Hagenest et al. | 23/77 |
| 3,262,891 | 7/1966 | Abrams | 260/2.1 R |

Primary Examiner—Oscar R. Vertiz
Assistant Examiner—Hoke S. Miller
Attorney—Harry J. McCauley

[57] ABSTRACT

A method of removing cyanide values from aqueous solutions containing sodium or potassium cyanide, or the sodium or potassium salts of the complex cyanides of the metals copper, nickel, zinc, silver, gold and cadmium, utilizing a mixed bed of ion exchange resins.

6 Claims, No Drawings

ION EXCHANGE REMOVAL OF CYANIDE VALUES

BRIEF SUMMARY OF THE INVENTION

Generally, this invention comprises the method of removing cyanide values from an aqueous process solution containing compounds of the group consisting of sodium cyanide, potassium cyanide, and the sodium and potassium salts of the complex cyanides of the metals copper, nickel, zinc, silver, gold and cadmium comprising, in sequence, the steps: (1) adding sufficient ions of the group copper, nickel, zinc, silver, gold and cadmium to the process solution to convert the sodium and potassium cyanide content thereof to the sodium and potassium salts of the complex cyanides of copper, nickel, zinc, silver, gold and cadmium, (2) passing the process solution from step (1) through an ion exchange bed composed of a mixture of the hydrogen form of a cation exchanger selected from the group consisting of carboxylic, phosphonic, and sulfonic ion exchange resins, and the free base form of a weak base anion exchange resin to convert a portion of the sodium and potassium salts of the complex cyanides of copper, nickel, zinc, silver, gold and cadmium to their corresponding acids, (3) removing the corresponding acids progressively, as formed, by combination with the weak base resin until substantially all cyanide values are removed from the process solution, (4) withdrawing the process solution from the ion exchange bed and, optionally, (5) removing said acids from the weak base resin of step (3) by contacting with sodium, or potassium hydroxide to form the salts of said acids, and (6) returning said salts of said acids to the electroplating bath, or to other desired use.

Sodium and potassium cyanides are used in large quantities in the electroplating of the metals copper, nickel, zinc, silver, gold and cadmium, and these highly toxic substances, together with complex cyanides of these metals, frequently go to the sewer as rinse washes, vitiated baths and accidental spills. It is imperative that the cyanide values be completely removed from plant effluent in order to avoid stream pollution, and it is equally important that the metals be removed, as these are objectionable pollutants also.

Economically, it is highly desirable to effect the removal in a manner such that the cyanides and metals can be recycled to the plating operation with a minimum of intervening processing.

It is an object of this invention to accomplish complete removal of both cyanides and metals, followed by their subsequent recovery for reuse in a form adapted to electroplating utilization. However, it will be understood that this process can also be used where the objective is solely removal per se to safeguard against pollution.

The invention will be explained with particular reference to the recovery of copper and cyanide values from a copper electroplating operation, wherein sodium cyanide is utilized as a plating bath ingredient. It will be understood that the other metals for which my invention is effective, i.e., nickel, zinc, silver, gold and cadmium, behave in an analogous manner to copper and, consequently, can be handled in the same general way.

The rinse water from a copper plating operation contains, in relatively dilute concentrations, sodium cyanide and the sodium salts of the complex cyanides of copper, e.g., $NaCu(CN)_2$ or $Na_2Cu(CN)_3$. It is necessary to convert any sodium cyanide to a copper complex cyanide by addition of copper ions because, during the ion exchange process, the salts are converted to their corresponding acids, and the hydrogen cyanide, converted from sodium cyanide, will not be held, except to a very limited extent, by a weak base resin. However, the acids corresponding to the complex cyanides of copper are held by a weak base resin. As hereinafter described, cuprous cyanide is especially preferred; however, cuprous oxide can be used instead, or in mixture with cuprous cyanide.

The conversion of the "free" sodium cyanide to sodium cuprocyanide can be achieved conveniently by passing the solution containing the sodium cyanide, i.e., the bath or other solution which it is desired to treat, through a column packed separate pills or pellets formed by compressing cuprous cyanide.

The ion exchange system utilized is composed of a mixture of the hydrogen form of an acid resin and the free base form of a weak base resin. As is customary, the two resins should be of sufficiently different densities to permit their segregation, during backwash, one from another into separate layers, so that each can be regenerated by a separate regenerant when the bed becomes exhausted.

A weak acid resin of the carboxylic type is particularly desirable in many applications, because of its high capacity and also because it can be regenerated effectively with a weak acid solution. This particular type of resin, in the desired hydrogen form, is regarded as a "slow resin," because it ionizes slowly. The reaction rate in the mixed bed can be increased if a strong acid resin, e.g., a sulfonic acid resin, is substituted for part of the weak acid resin. The specific gravities of the two cation resins should be somewhat alike to permit their joint separation from the weak base resin by backwashing.

If desired, the acid resin can be of strong acid form exclusively; however, this is normally not preferred because of the excessive amount of regenerant which must be employed, and this has to be disposed of ultimately by neutralization, which is both expensive and troublesome. Phosphonic type resins are intermediate in strength between carboxylic and sulfonic types, and can be utilized if desired, although these do not regenerate as efficiently as the weak acid resins such as the carboxylic type, which are preferred in this invention.

After copper salt treatment, the rinse water is passed into the mixed bed, where the sodium salts of the cyanide complexes are converted, to a slight degree, to their corresponding acids by the acid form resin. These acids are immediately removed from the solution by the weak base resin. Removal of the acids disturbs the reaction equilibrium, permitting more acids to be generated, and these are progressively removed as formed. After a relatively short time, all of the complex cyanides, constituting the total of cyanide values, are removed from the rinse waters. The complex cyanides which are isolated on the weak base resins are recovered for recycle to the process by regeneration of this resin with a suitable base, which can be sodium hydroxide solution or the even lower cost ammonium hydroxide, if presence of ammonium ions is not objectionable from the standpoint of ultimate disposition of the effluent. The regeneration effluent can be relatively concentrated so that the mixed sodium salts of the copper cyanide complexes can be recycled directly, without concentration, to the electroplating bath to restore copper and cyanide values to the process. The several reactions can be represented by the following equations:

(1a. $NaCN + CuCN \rightarrow NaCu(CN)_2$ (1b. $4NaCN + Cu_2O + 3OH^- \rightarrow 2NaCu(CN)_2 + 2NaOH + H_2O$ 2. $Resin\text{-}COOH + NaCu(CN)_2 \rightleftarrows HCu(CN)_2 + Resin\text{-}COONa$ 3. $HCu(CN)_2 + Resin\text{-}NR_2 \rightarrow Resin\text{-}NR_2\cdot HCu(CN)_2$ 4. $Resin\text{-}NR_2\cdot HCu(CN)_2 + NaOH \rightarrow NaCu(CN)_2 + Resin\text{-}NR_2 + H_2O$ The process is completely effective in the removal of cyanide values from rinse waters containing highly variable amounts of cyanide value. Usually, the first rinse water contains relatively high cyanide concentrations, whereas dilution occurs as washing proceeds. My process is not sensitive to such concentration variations and is easily capable of removing concentrations of copper complex cyanide as high as 3,000 ppm or more, so that the effluent approaches 1 ppm cyanide.

Where single metals are plated, only the ions of the metal involved are required to convert to the complex metal cyanide forms indicated by Equations (1). For brass plating, the addition of a mixture of copper and zinc ions is desirable. For best utilization of the exchange resins, it is preferred that the metals be added as their cyanides, or oxides. If other salts are added, the exchange capacity of the anion resin is utilized by the acid of the foreign anion, and this foreign anion could then be returned to the plating system when the exchanger is regenerated.

It is, of course, possible to operate the exchanger as a chromatographic column during the loading or the regeneration, to thereby displace the foreign anions such as sulfate or chloride, which avoids contamination of the bath, and thereafter route the cyanide values to the bath. However, this is a complication which is avoided by selection of the cyanide as the preliminary treatment salt.

The process of this invention is entirely applicable to potassium cyanide as well as sodium cyanide, the former being particularly preferred as an electroplating bath ingredient for high speed plating and certain surface effects.

At the end of any run, and before regeneration, it is desirable to rinse the entire mixed bed with a base, such as a water solution of NaOH, $Na_2CO_3$ or $NH_4OH$, in order to eliminate any cyanide hazard arising from residual occluded cyanide-containing solution on or within the resin particles. This concurrently regenerates the base resin.

Following this, the bed is backwashed to separate the acid resin and the base resin into individual layers, and the acid resin is regenerated by contacting it alone with an acid solution. Thereafter, after rinsing residual regenerating acid and base from the two resin layers, the two resins are remixed by air, restoring the system to its original condition for reuse in cyanide removal service.

Since the efficacy of the mixed resin bed is especially dependent upon intimate contact between well-mixed particles of both acid and base resins, it is desirable to add a small amount of bentonite suspension to the fresh resin at start-up in order to forestall resin particle clumping, all as taught in U.S. Pat. No. 3,262,891. It has been found that a single treatment with bentonite at the outset is usually all that is necessary, and that retreatment is required only when fresh resin is added to the system.

Weak carboxylic acids can include those taught in U.S. Pat. No. 2,340,111, such as Rohm & Hass Co. IRC–50, which is a copolymer made from methacrylic acid and divinylbenzene. Another such resin is IRC–84, which is a polymer made from crosslinked acrylic acid.

The weak base resin can be IRA–93; however, IR–68, having the composition taught in U.S. Pat. Nos. 2,591,574, and 2,675,359, can also be used.

EXAMPLE

Approximately 105 ml. of hydrogen form CC-3 resin, a weak carboxylic acid type marketed by the Diamond Shamrock Co., was treated successively three times by contacting in a beaker with three separate volumes of 100 ml. each 5 percent HCl. The resin was then transferred to a 25 mm. I.D. glass column and further treated with 100 ml. of 5 percent HCl.

The resin was then rinsed with 500 ml. of distilled water until the column effluent was almost neutral to methyl red indicator. The thoroughly regenerated and rinsed resin was then removed from the column. 100 ml. of the regenerated and rinsed CC-3 resin were then mixed with 100 ml. of Rohm & Haas Co. IRA-93 weak base resin, which was used, without pretreatment, in the free base form.

A very small amount (weighing less than 0.5 gm) of ground Wyoming bentonite was added to destroy electrostatic charges in the resins, which were well mixed by stirring with a spatula. The mixed resin-bentonite was then transferred to a 25 mm I.D. glass column, forming a bed measuring 41.7 cm. in depth.

A solution approximately equivalent to rinse water from a copper cyanide electroplating process was prepared by diluting plating bath solution to 0.1 its original concentration. The undiluted plating bath contained 7.44 oz. Cu/gal. and 1.67 oz. NaCN/gal.

One-thousand ml. of the diluted bath were run downwardly through the mixed resin bed during a period of 140 mins., i.e., at a rate of about 7.1 ml./min., until there was a breakthrough of copper. Breakthrough was signaled by the development of the characteristic blue color of copper when a sample of effluent was mixed with ordinary household bleach, containing about 4 percent NaOCl. At breakthrough, the bed height measured 48.5 cm. After rinsing with 2,000 ml. of water in 55 minutes, the bed height measured 49.2 cm.

The mixed bed was then treated with 180 ml. of 4 percent NaOH solution during a 33 minute period, which was followed by a 35 minute rinse with 320 ml. of distilled water, the rinse being collected in the same vessel with the NaOH wash. The resin bed height at this point measured 51.6 cm.

A material balance showed that there was 5.58 gm. Cu in the 1,000 ml. of diluted bath fed to the resin, which calculates to 0.879 milliequivalents of Cu/ml. of weak base resin. The theoretical capacity of the resin was 1.4 milliequivalent/ml. Analysis of the 4 percent NaOH solution plus rinse showed that a total of 23 milliequivalents of copper was recovered, i.e., 0.23 milliequivalent per ml. of weak base resin. Further tests employing 10 percent NaOH as copper cyanide complex disengaging agent showed substantially complete removal of all copper from the resin.

What is claimed is:

1. The method of removing cyanide values from an aqueous process solution containing compounds of the group consisting of sodium cyanide, potassium cyanide, and the sodium, and potassium salts of the complex cyanides of the metals copper, nickel, zinc, silver, gold, and cadmium comprising, in sequence, the steps: (1) adding sufficient ions of the group copper, nickel, zinc, silver, gold and cadmium to said process solution to convert the sodium and potassium cyanide content thereof to the sodium and potassium salts of the complex cyanides of copper, nickel, zinc, silver, gold and cadmium, (2) passing said process solution from step (1) through an ion exchange bed composed of a mixture of the hydrogen form of a cation exchanger selected from the group consisting of carboxylic, phosphonic, and sulfonic ion exchange resins and mixtures thereof, and the free base form of a weak base resin anion exchanger to convert a portion of said sodium and potassium salts of said complex cyanides of copper, nickel, zinc, silver, gold and cadmium to their corresponding acids, (3) removing said corresponding acids progressively, as formed, by combination with said weak base resin until substantially all cyanide values are removed from said process solution, and (4) withdrawing the process solution from the ion exchange bed.

2. The method of removing cyanide values from an aqueous process solution according to claim 1 wherein said ion exchange bed is a mixture of the hydrogen form of a carboxylic ion exchange resin and the free base form of a weak base resin.

3. The method of removing cyanide values from an aqueous process solution according to claim 1 wherein said ion exchange bed is a mixture of the hydrogen form of a phosphonic ion exchange resin and the free base form of a weak base resin.

4. The method of removing cyanide values from an aqueous process solution according to claim 1 in which the cation exchange portion of the mixed bed is composed of a mixture of carboxylic and sulfonic resins.

5. The method of removing cyanide values from an aqueous process solution according to claim 1 wherein said acids are periodically removed from the weak base resin of step (3) by contacting with sodium or potassium hydroxide to form the salts of said acids.

6. The method of removing cyanide values from an aqueous process solution according to claim 5 wherein said salts of said acids are returned to said electroplating bath or other desired use.

* * * * *